US010803618B2

(12) United States Patent
Hiltner et al.

(10) Patent No.: US 10,803,618 B2
(45) Date of Patent: Oct. 13, 2020

(54) MULTIPLE SUBJECT ATTENTION TRACKING (71) Applicant: Intel Corporation, Santa Clara, CA (US)

(72) Inventors: Matthew Hiltner, Hillsboro, OR (US); James Ausmus, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 16/021,741

(22) Filed: Jun. 28, 2018

(65) Prior Publication Data
US 2019/0043218 A1 Feb. 7, 2019

(51) Int. Cl.
*G06T 7/73* (2017.01)
*H04N 5/232* (2006.01)
*H04N 5/222* (2006.01)
*H04N 5/247* (2006.01)
*G01S 5/16* (2006.01)

(52) U.S. Cl.
CPC ............. *G06T 7/75* (2017.01); *G01S 5/16* (2013.01); *H04N 5/2228* (2013.01); *H04N 5/232* (2013.01); *H04N 5/23219* (2013.01); *H04N 5/23296* (2013.01); *H04N 5/247* (2013.01); *G06T 2207/30201* (2013.01)

(58) Field of Classification Search
CPC ... G06T 7/75; G06T 2207/30201; G01S 5/16; H04N 5/2228; H04N 5/232; H04N 5/23219; H04N 5/23296; H04N 5/247
USPC .......................................................... 348/169
See application file for complete search history.

(56) References Cited

U.S. PATENT DOCUMENTS

| 2002/0141650 | A1* | 10/2002 | Keeney | H04N 19/115 382/239 |
| 2007/0140526 | A1* | 6/2007 | Pirim | G06K 9/6212 382/103 |
| 2016/0335475 | A1* | 11/2016 | Krenzer | G06K 9/00335 |
| 2016/0379261 | A1* | 12/2016 | Avalos | G06Q 30/0261 705/14.58 |
| 2017/0024609 | A1* | 1/2017 | Nishikawa | H04L 67/04 |
| 2019/0261027 | A1* | 8/2019 | Hawke | G06F 3/013 |
| 2019/0361526 | A1* | 11/2019 | Young | G06F 3/011 |

* cited by examiner

*Primary Examiner* — William C Vaughn, Jr.
*Assistant Examiner* — Jae N Noh
(74) *Attorney, Agent, or Firm* — Schwegman Lundberg & Woessner, P.A.

(57) ABSTRACT

A system for multiple subject attention tracking includes: an input video controller to receive images of a plurality of people in an audience viewing an event occurring in a presentation area; a gaze detection circuit to: determine a plurality of gaze vectors of respective people of the plurality of people based on the images; and identify a fixation area using the plurality of gaze vectors; and a presentation controller to control at least one of a camera or a spotlight, to focus on the fixation area.

23 Claims, 6 Drawing Sheets

MULTIPLE SUBJECT ATTENTION TRACKING

TECHNICAL FIELD

Embodiments described herein generally relate to vision-based systems, and in particular, to systems and methods for multiple subject attention tracking.

BACKGROUND

During a live event production, it is not uncommon for one or more cameras to be used to broadcast the event. Camera operators are tasked with following the action. In a live setting, human camera operators have inherent limitations due to the unpredictable nature of the actors, players, or other people in the production.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide multiple subject attention tracking. During live productions, one or more camera operators are tasked with following the live action. Examples include concerts, sporting events, political rallies, or the like. Camera operators and video producers have to manually identify and appropriately frame the desired content. These human roles have inherent limitations. For instance, camera operators who may have a limited view of the action because of the camera viewfinder's field-of-view, may not realize action happening away from the main part of a sporting play. Viewers of the video broadcast may be denied the enjoyment of seeing events that happen off-camera, which live audience viewers in the location are able to see. What is needed is an improved camera direction system that uses the attention of the live audience to direct the cameras in the venue.

The systems and methods described herein use a camera array to monitor an audience and determine the fixation of their attention. Aggregation of visual fixation points are observed in 2-dimensional (2D) and 3-dimensional (3D) space. Aggregation of visual fixation data is then used to determine a region in two dimensions or three dimensions where events of audience interest are occurring. Based on the collective fixation point, various actions may be taken. Examples of actions include, but are not limited to, changing the direction or focus of a broadcast camera to capture what the audience is fixated on, presenting supplemental audio-visual content to the audience at the fixation point, or the like.

Multiple aggregate fixation points may be tracked. Each fixation point may be the point of focus of a number of people. For instance, in an American football game, a large group of the audience may be focused on the quarterback while another substantial group may be focused on a free safety. Broadcast cameras may track both the quarterback and the free safety's positions on the field. A broadcast producer may switch between the camera feeds to alternate between the quarterback or free safety during live broadcast, instant replays, or the like.

Described here is an improved camera system to follow the attention of the audience. This technique avoids reliance on human direction or intuition, which may not accurately follow the point of attention of an audience. The improved system is able to respond to unforeseen events nearly instantaneously.

Figure 1:
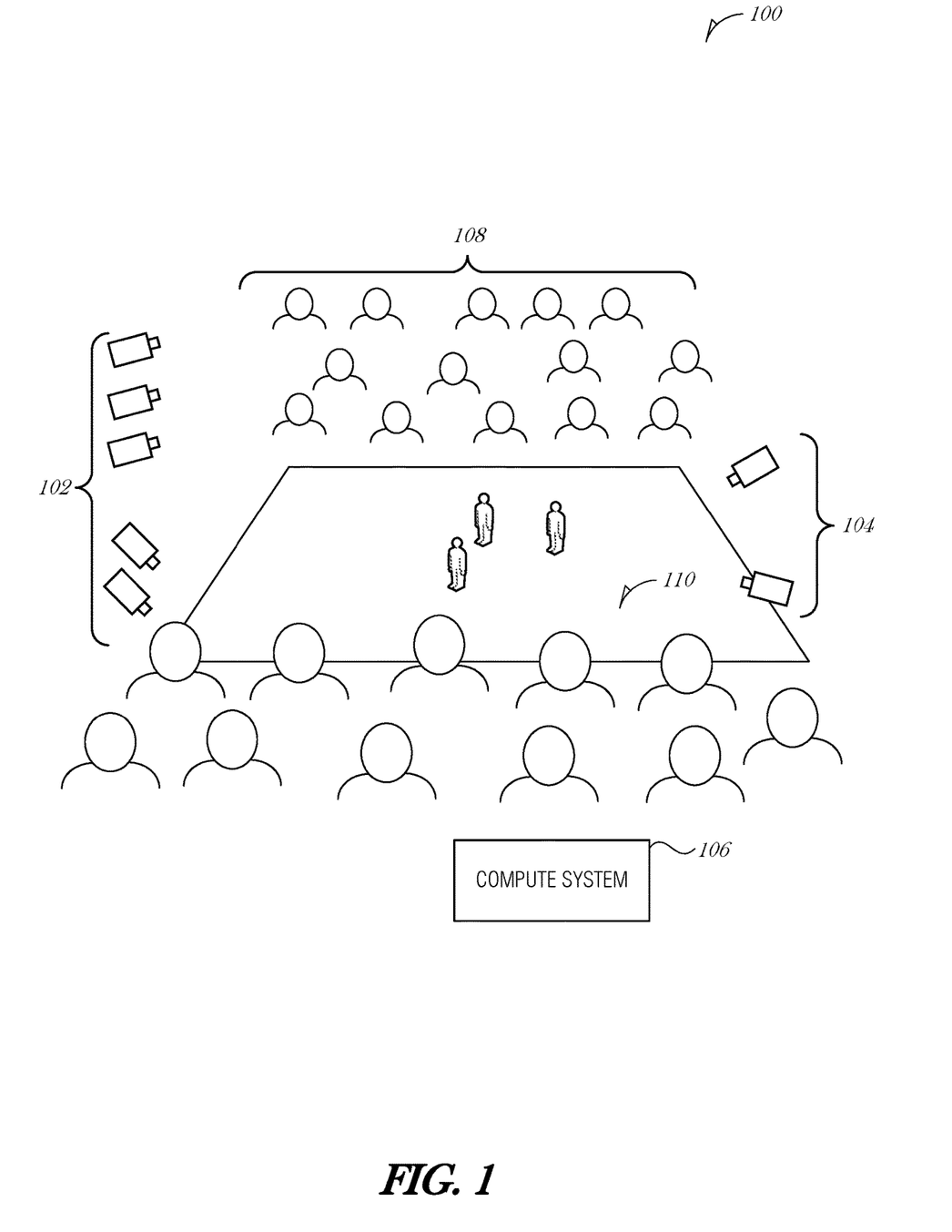
FIG. 1 is a schematic diagram illustrating an operating environment, according to an embodiment.

FIG. 1 is a schematic diagram illustrating an operating environment 100, according to an embodiment. The operating environment 100 includes an audience-facing camera array 102, a broadcast camera array 104, and a compute system 106. The operating environment 100 may be any type of live event including, but not limited to a sporting event, a political rally, a music concert, a theatrical event, a horse race, a parade, or the like. In these types of live events, there is an audience 108 and a performance area 110. The audience 108 may surround the performance area 110 (e.g., in a sports arena), be intermingled with the performance area 110 (e.g., in a parade), or generally on one side of the performance area 110 (e.g., in a stage setting). In addition, the audience 108 may be above the performance area 110 (e.g., in a tall stadium seating arrangement) or below the performance area 110 (e.g., while watching an aerial performance at a circus). The systems and techniques described here work for any configuration of one or more audience sections and one or more performance areas at an event.

The audience-facing camera array 102 includes one or more cameras that face an audience 108 at an event. For instance, with a small audience 108 of a few dozen people, there may only be one or two cameras in the audience-facing camera array 102. In a larger audience 108 with many thousands of people, there may be separate cameras to cover each seating section in the arena, for example. The audience-facing camera array 102 is used to track the eye gaze of people in the audience 108. Cameras in the audience-facing camera array 102 may perform the eye gaze tracking technique. Alternatively, images captured by the audience-facing camera array 102 are offloaded to another system, such as compute system 106, to perform the eye gaze direction determination.

Gaze detection may be performed using a non-contact, optical method to determine eye motion. In some systems, using geometrical analysis of a person's head, irises within the person's eyes, head rotation with respect to the person's body, or other morphological analyses may be used to determine the gaze direction of a person. Other tracking methods may be used individually or in combination to estimate the gaze direction or gaze vector of an audience member.

Based on the gaze detection, a gaze direction of audience members is determined. It is understood that not all audience members may be analyzed. For instance, when a person's face or head is obscured by another person, then the gaze direction may not be attainable. The gaze direction is a vector positioned along a visual axis, pointing from the center of the field of vision, through the center of the person's pupil, to the fixation point. Although a person's binocular gaze includes two gaze vectors, a single gaze vector may be computed to reduce computational complexity. The fixation point may not be highly accurate. For instance, to reduce computational complexity, the gaze vector may resolve to a general fixation area. The exact accuracy of any one fixation point may not be critical when tens or thousands of samples are used across the entirety of the audience. In some implementations, a statistical aggregate may be used to determine a relatively accurate fixation area. Depending on the number of samples, the accuracy of measurements, or other factors, the fixation area may be estimated with relative accuracy, such as a 10-meter circle. Relative accuracy does not require pinpoint accuracy. The size of the fixation area should be constrained such that the camera is able to capture the fixation area and some area around the fixation area, to better frame the field-of-view for viewers.

Once the gaze vectors of the audience 108 are determined, one or more fixation areas are identified. A fixation area is a two-dimensional area or three-dimensional space where a number of audience members are looking. To be recognized as a fixation area, the compute system 106 performs calculations to determine whether more than a threshold number of people in the audience 108 are fixated on a particular place. If so, then a fixation area may be identified. For instance, using an audience size of 1000 people, if more than 30% of the people are looking at the same place, then the compute system 106 may determine that place is a fixation area. In such an instance, there may be one, two, or even three fixation areas where more than the threshold number (e.g., 30% of the audience) is focused.

Various operations may be used in response to determining a fixation area. In an embodiment, a broadcast camera of the broadcast camera array 104 is automatically moved to capture the fixation area. The broadcast camera may follow the fixation area as it moves about the performance area 110. In this way, a broadcast producer may have a camera feed provided by the broadcast camera that automatically captures a field-of-view consistent with a fixation area.

Other operations may be used in place of or in conjunction with broadcast camera tracking, such as lightshow or lighting effects. For instance, a spotlight may be robotized or otherwise adapted to track the fixation area of an audience. In such an embodiment, when a performer moves about a stage (e.g., presentation area 110), the spotlight may track the performer automatically based on the fixation area determined by analyzing the audience's gaze vectors.

Once the fixation area is identified, an object of interest in the fixation area may also be identified. For instance, if the audience is focused on one actor in a cast of actor, the actor may be identified (e.g., using facial recognition), and additional information may be presented to the remote audience. In the context of a stage play or musical, the actor's bio, previous work, related programs, or other information may be presented to the remove viewer. As the local audience's attention changes to other cast members, the supplemental information presented to the remote viewer may change. Additional aspects are described below.

Figure 2:
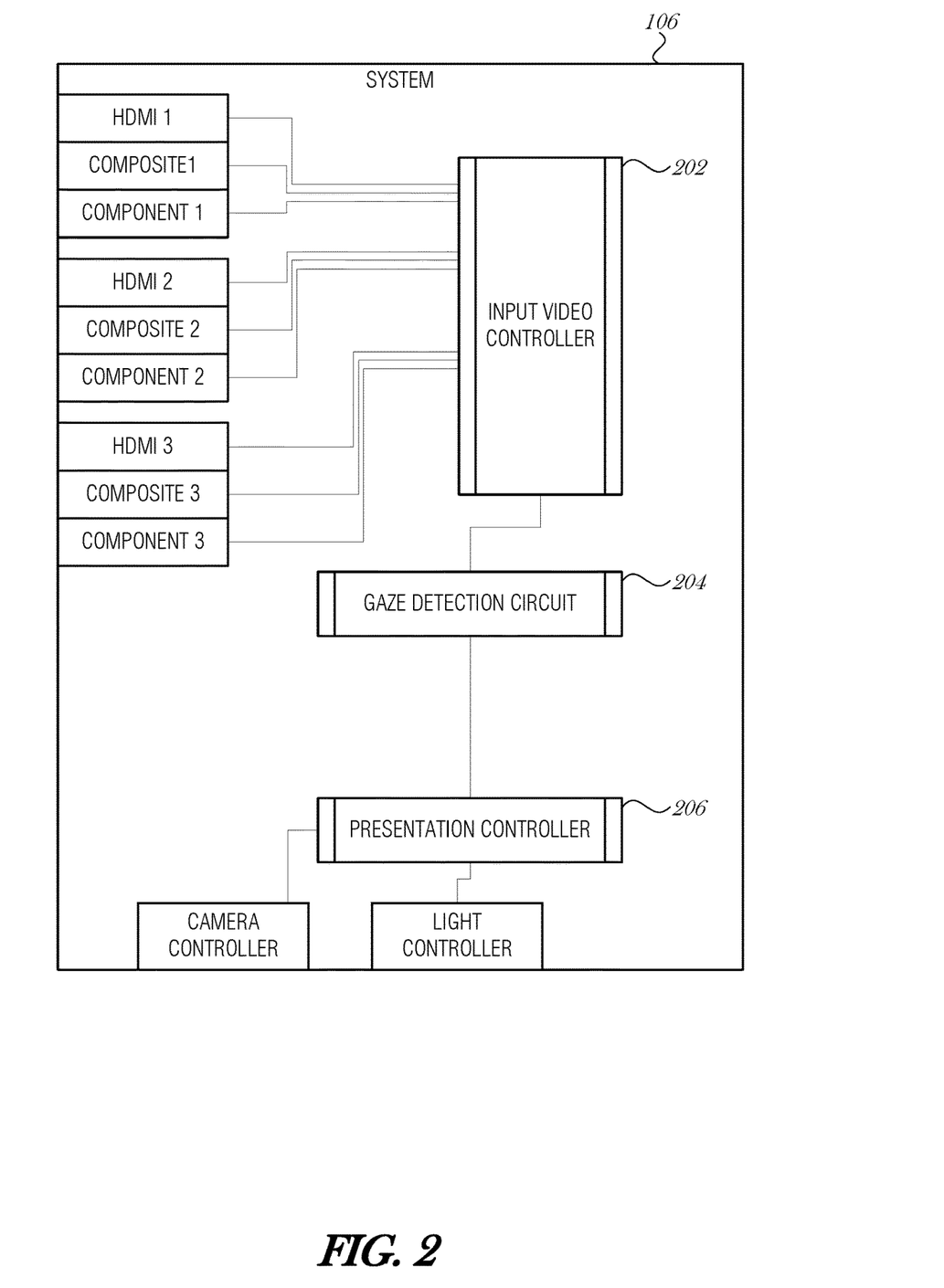
FIG. 2 is a block diagram illustrating a system for using audience fixation, according to an embodiment.

FIG. 2 is a block diagram illustrating a system 106 for using audience fixation, according to an embodiment. The system 106 includes a input video controller 202, a gaze detection circuit 204, and a presentation controller 206. The system 106 may be incorporated into a video production board, digital video mixer, or the like, to provide camera control to a human producer.

The input video controller 202 is adapted, configured, or programmed to receive image data from one or more audience-facing cameras (e.g., audience-facing camera array 102 of FIG. 1). The input video controller 202 may include multiple communication lines to each of several cameras.

The input video may be received with various types of transport technologies, such as a composite video signal, component video signal, HDMI, RGB, S-video, NTSC over HF, DisplayPort, VGA, DVI, PAL/NTSC over coax, or the like. Image data is sent to the gaze detection circuit 204.

The gaze detection circuit 204 analyzes one or more images to determine gaze vectors of the people in the images. The gaze detection circuit 204 may analyze various features of a person in one or more images, such as the body posture, shoulder position, head position, head and shoulder relative positions, iris position relative to head position, absolute iris position, body gestures (e.g., pointing in a direction consistent with gaze), or the like. Additionally, several images may be used, with images from different perspectives of the person. For instance, several images may be composited into a 3D model of the person, and the model may be analyzed to determine the gaze vector. Use of a 3D model may provide a more accurate gaze vector.

The gaze detection circuit 204 may be configured to determine a primary fixation area and zero or more secondary fixation areas. The primary fixation area may be determined based on various metrics, including how many gaze vectors converge on a given area or space. The number of gaze vectors, the proportion of gaze vectors (e.g., percentage of audience with a similar gaze vector), or other metrics may be used to identify a fixation area. For instance, the gaze detection circuit 204 may be configured such that a primary fixation area is identified when more than 50% of the gaze vectors converge on a given area. The gaze detection circuit 204 may further be configured such that if more than 30% of the remaining gaze vectors converge on another fixation area, then a secondary fixation area may be declared.

Example thresholds may be based on actual values as well. For instance, if more than 1000 gaze vectors converge on an area, then the area may be deemed a primary fixation area. The number may be configured by an administrator and may be based on the expected audience size, the actual audience size, or other metrics.

Example configurations are illustrated in the TABLE 1 below.

TABLE 1

| Primary Fixation Area | Secondary Fixation Area | Tertiary Fixation Area |
|---|---|---|
| 30% of gaze vectors converge | 20% of gaze vectors converge | 15% of gaze vectors converge |
| 50% of gaze vectors converge | 25% of gaze vectors converge | |
| 60,000 gaze vectors converge | 30,000 gaze vectors converge | 5,000 gaze vectors converge |

The gaze detection circuit 204 may store the fixation areas in memory shared with the presentation controller 206. The presentation controller 206 may be used to control one or more mechanisms. For instance, the presentation controller 206 may provide camera control to autonomously control one more cameras and track a fixation area or areas. As another example, the presentation controller 206 may control one or more spotlights to track a fixation area or areas. It is understood that other functions may be controlled by the presentation controller 206.

The presentation controller 206 may implement heuristics to control cameras, spotlights, or the like. For instance, in the context of camera control, heuristics may be applied to determine the median fixation point within a fixation area and the fixation boundaries. When a number of gaze vectors are resolved to a certain fixation area, it is understood that the gaze vectors will not resolve to singular point in space. The fixation area is likely a space around a person or event that the audience is fixated on. For proper image composition, the subject of the fixation should be in roughly the center of the image frame. The boundaries of the frame, which is largely dictated by the zoom factor used on the camera, may also be controlled by the presentation controller 206 to provide a well-composed image.

Additionally, the presentation controller 206 may control cameras, lights, or other mechanisms to constrain such mechanisms to a certain area (e.g., the performance area 110 of FIG. 1). Using such constraints, even if the audience is focused on an event occurring outside of the performance area, the cameras may not fixate on it. This may be useful, for example, in the case of a disruption or other event that causes the audience to turn their attention, where the disruption is not something that should be immediately broadcast to a wider audience. For instance, a political demonstration may be conducted in a manner that would not be consistent with the main broadcast topic. If the demonstration is in the viewing stands, then the cameras may not automatically track to the audience's fixation area because it is out of the bounded performance area.

Additionally, cameras used to capture the fixation area may also be used to capture one or more people in the fixation area for facial recognition analysis or other identification analysis. The people captured may be identified and then supplemental information about those people may be obtained from a private or public data source. The supplemental information may be presented along with the video of the fixation area, in a broadcast to remote viewers. For instance, in a football game, the audience's fixation area may first be on the quarterback. While showing the quarterback in the video broadcast, game statistics may be obtained from a player database and displayed in an overlay graphic within the video broadcast. This type of automatic video annotation provides additional relevant information to the viewer. As the camera views change to different fixation areas, the information displayed to the remote viewers may also change. A video producer may alter, suppress, or otherwise control what and how information is broadcast to the remote viewer.

Figure 3:
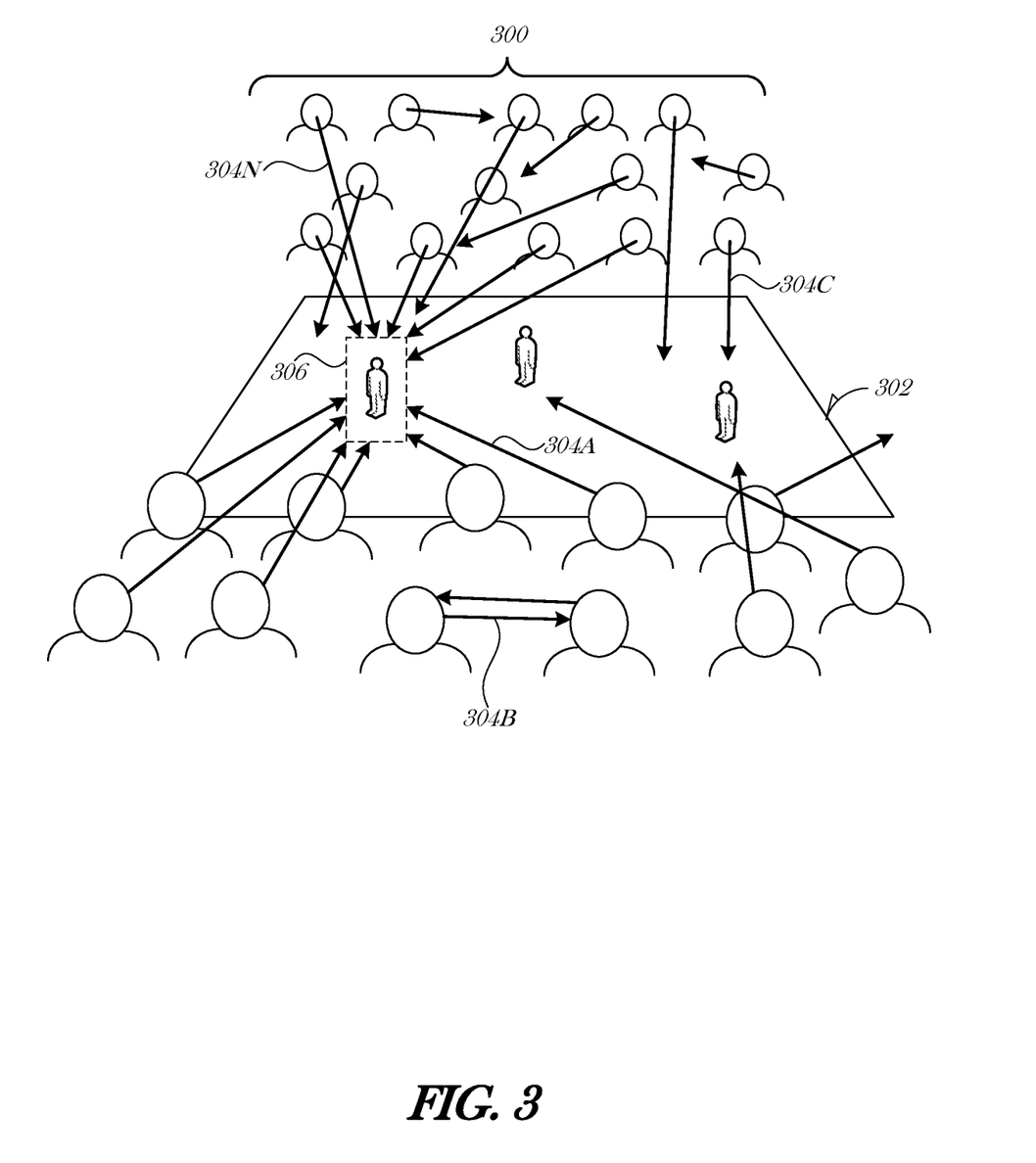
FIG. 3 is a schematic figure illustrating an example scenario, according to an embodiment.

FIG. 3 is a schematic figure illustrating an example scenario, according to an embodiment. An audience 300 is viewing a performance on a performance area 302. Gaze vectors 304A, 304B, . . . , 304N (collectively referred to as 304) are determined for the audience 300. The gaze vectors 304 are illustrated with arrows. Some gaze vectors 304 are discarded or ignored. For instance, gaze vector 304B is discarded or ignored because it does not fall in an eligible region (e.g., the performance area 302).

The gaze vectors 304 are analyzed and one or more fixation areas are identified. In an embodiment, gaze vectors 304 may be weighted, such that the gaze vectors 304 that converge on a fixation area 306 are weighted higher than stray gaze vectors 304, which are not directed toward the fixation area 306. Examples of stray gaze vectors 304 include gaze vector 304C, which appears to be directed toward an eligible region (e.g., the performance area 302), but not at the fixation area 306, and gaze vector 304B, which appears to be directed to an ineligible region (e.g., another audience member). As described above, gaze vectors 304 may be aggregated and thresholded to determine one or more fixation areas 306. Gaze vectors 304 that are directed toward a fixation area 306 are then used to define an appropriate bounding box for fixation area 306. This bounding box may be used by a camera control system or rendering software for use in production to control the field of view.

Figure 4:
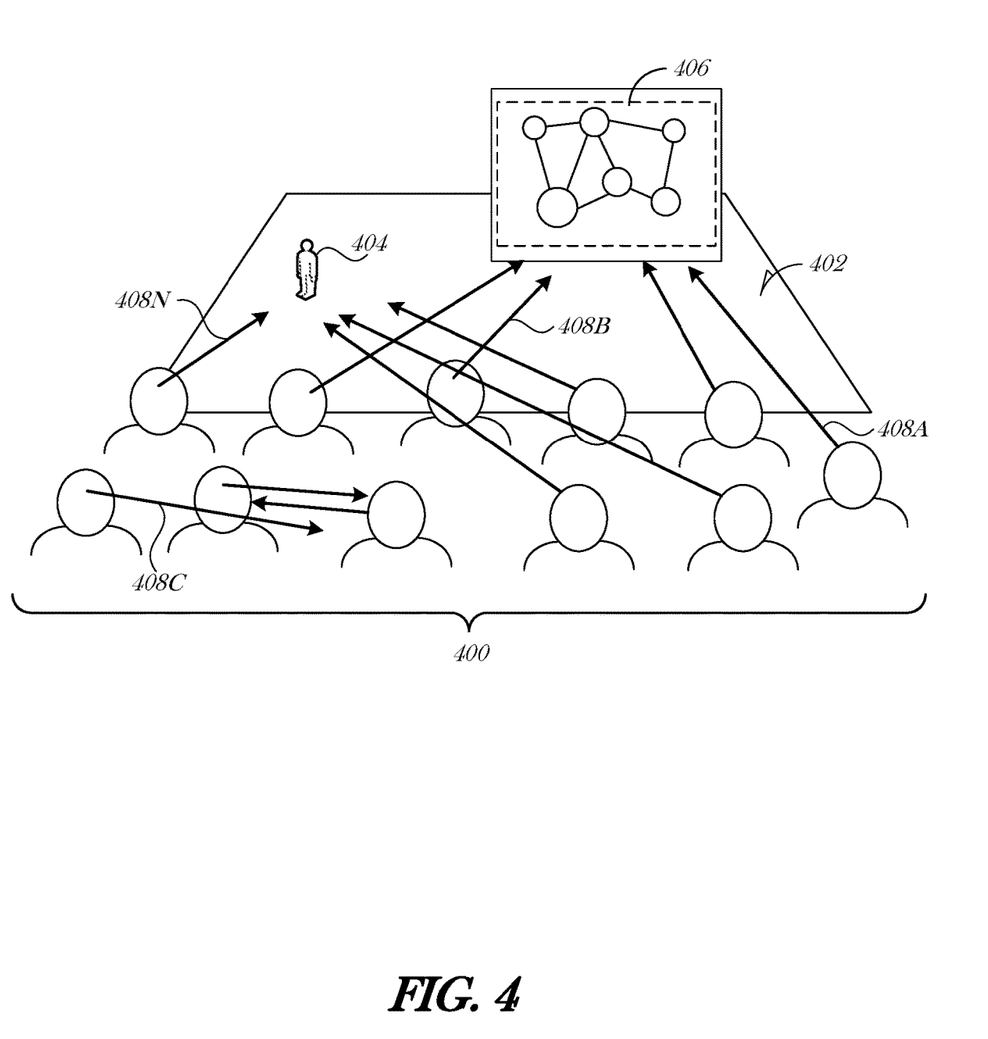
FIG. 4 is a schematic figure illustrating another example scenario, according to an embodiment.

FIG. 4 is a schematic figure illustrating another example scenario, according to an embodiment. An audience 400 is viewing a lecture on a performance area 402. A lecturer 404 is using a presentation 406, such as a slide show or other audiovisual presentation. Gaze vectors 408 of the audience 400 may be roughly split between the lecturer 404 and presentation 406. Because of the diversity of gaze vectors, the system may elect to present one wide fixation area that encompasses both the lecturer 404 and the presentation 406, or distinguish two separate fixation regions, which the producer may alternate between.

Figure 5:
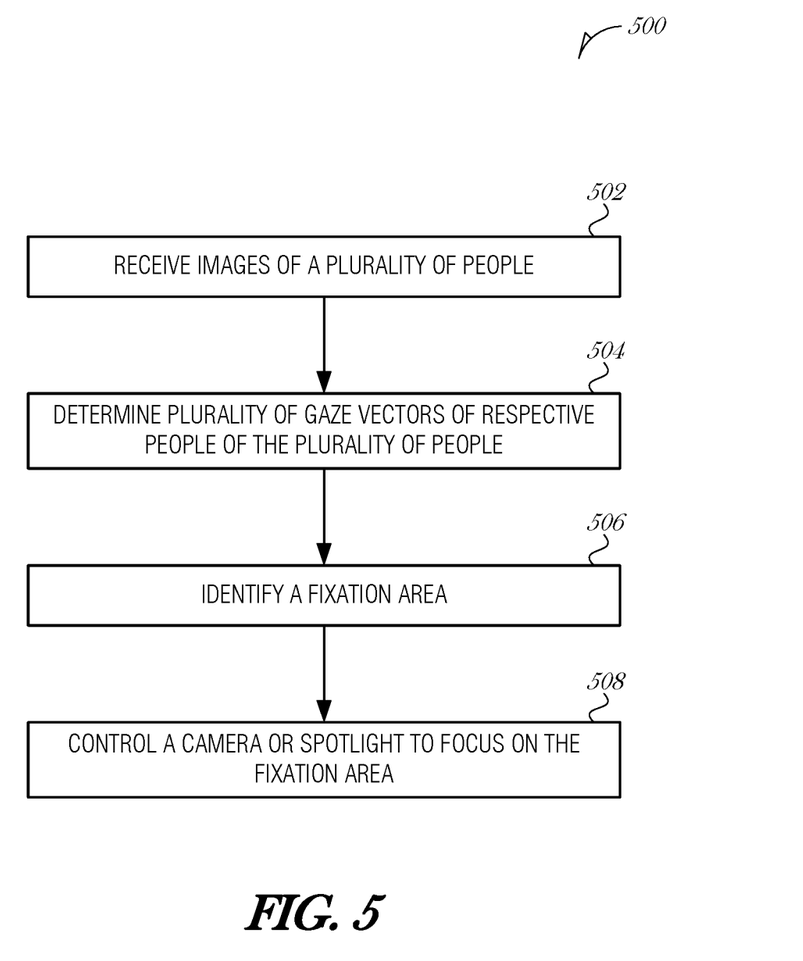
FIG. 5 is a flowchart illustrating a method of multiple subject attention tracking, according to an embodiment.

FIG. 5 is a flowchart illustrating a method 500 of multiple subject attention tracking, according to an embodiment. At 502, images of a plurality of people in an audience viewing an event occurring in a presentation area are received. In various embodiments, the receiving images operation includes receiving images over a composite video channel, a component video channel, an HDMI video channel, or an S-video channel.

At 504, a plurality of gaze vectors of respective people of the plurality of people based on the images is determined. In an embodiment, determining the plurality of gaze vectors includes analyzing a posture of a person in the images to determine a gaze direction of the person. In an embodiment, determining the plurality of gaze vectors includes analyzing a head position of a person in the images to determine a gaze direction of the person. In an embodiment, determining the plurality of gaze vectors includes analyzing an eye position of a person in the images to determine a gaze direction of the person.

In another embodiment, determining the plurality of gaze vectors includes the operations of combining multiple images to create a three-dimensional model of a person a person in the images, and using the three-dimensional model to determine a gaze direction of the person.

At 506, a fixation area using the plurality of gaze vectors is identified. In an embodiment, identifying the fixation area includes the operations of calculating a number of gaze vectors that share a similar fixation area and identifying the fixation area as the similar fixation area when the number of gaze vectors exceeds a threshold number.

In another embodiment, identifying the fixation area includes the operations of calculating a number of gaze vectors that share a similar fixation area and identifying the fixation area as the similar fixation area when the number of gaze vectors exceeds a threshold percentage of gaze vectors.

In another embodiment, identifying the fixation area includes the operations of determining gaze vectors that share a similar fixation area, determining gaze vectors that do not converge on the similar fixation area, dismissing the gaze vectors that do not converge on the similar fixation area, and identifying the fixation area as the similar fixation area when the number of gaze vectors exceeds a threshold number. The threshold number may be set by an administrator. The threshold number may be set based on a number of people in the audience. The threshold number may be modified during a presentation or live event.

In another embodiment, identifying the fixation area includes the operations of using a weighted function to identify a number of gaze vectors that share a similar fixation area, and identifying the fixation area as the similar fixation area when the number of gaze vectors exceeds a threshold number. The threshold number may be set by an administrator. The threshold number may be set based on a number of people in the audience. The threshold number may be modified during a presentation or live event.

At 508, at least one of a camera or a spotlight is controlled to focus on the fixation area. In an embodiment, controlling the camera includes the operations of controlling the camera to follow the fixation area as the fixation area moves about the presentation area. Other camera operations may be used in the alternative, or in combination with following the fixation area, such as zoom in or out from the fixation area, panning across the fixation area, or the like.

In an embodiment, controlling the spotlight includes the operations of controlling the spotlight to follow the fixation area as the fixation area moves about the presentation area. Other spotlight operations may be used in the alternative, or in combination with following the fixation area, such as expanding or contracting the spotlight width, altering the spotlight color or intensity, changing the spotlight shape (e.g., change from a circle to a star-shaped spotlight), or the like.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
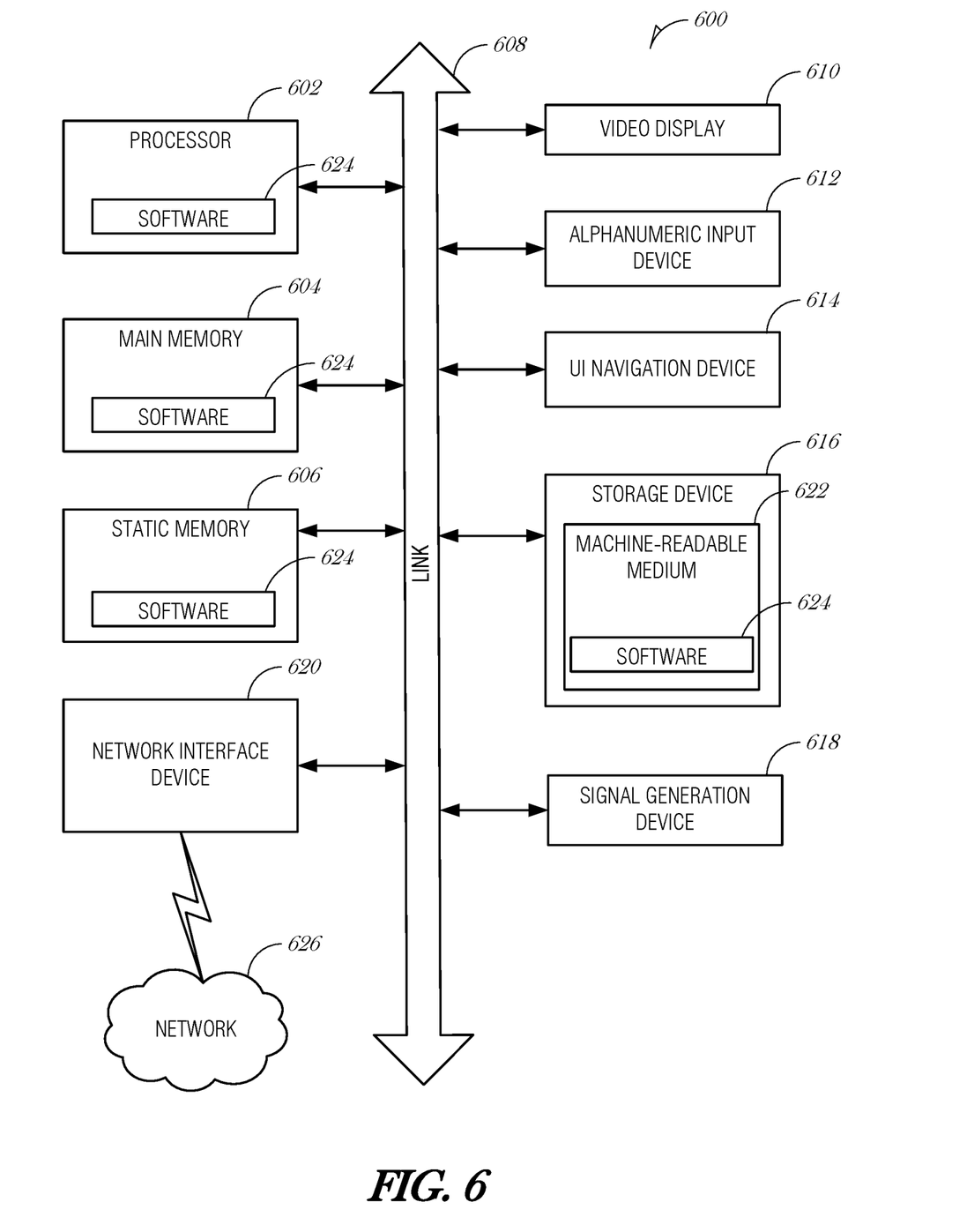
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a system for multiple subject attention tracking, the system comprising: an input video controller to receive images of a plurality of people in an audience viewing an event occurring in a presentation area; a gaze detection circuit to: determine a plurality of gaze vectors of respective people of the plurality of people based on the images; and identify a fixation area using the plurality of gaze vectors; and a presentation controller to control at least one of a camera or a spotlight, to focus on the fixation area.

In Example 2, the subject matter of Example 1 includes, wherein the video controller is to receive images over a composite video channel, a component video channel, an HDMI video channel, or an S-video channel.

In Example 3, the subject matter of Examples 1-2 includes, wherein to determine the plurality of gaze vectors, the gaze detection circuit is to analyze a posture of a person in the images to determine a gaze direction of the person.

In Example 4, the subject matter of Examples 1-3 includes, wherein to determine the plurality of gaze vectors, the gaze detection circuit is to analyze a head position of a person in the images to determine a gaze direction of the person.

In Example 5, the subject matter of Examples 1-4 includes, wherein to determine the plurality of gaze vectors, the gaze detection circuit is to analyze an eye position of a person in the images to determine a gaze direction of the person.

In Example 6, the subject matter of Examples 1-5 includes, wherein to determine the plurality of gaze vectors, the gaze detection circuit is to: combine multiple images to create a three-dimensional model of a person a person in the images; and use the three-dimensional model to determine a gaze direction of the person.

In Example 7, the subject matter of Examples 1-6 includes, wherein to identify the fixation area, the gaze detection circuit is to: calculate a number of gaze vectors that share a similar fixation area; and identify the fixation area as the similar fixation area when the number of gaze vectors exceeds a threshold number.

In Example 8, the subject matter of Examples 1-7 includes, wherein to identify the fixation area, the gaze detection circuit is to: calculate a number of gaze vectors that share a similar fixation area; and identify the fixation area as the similar fixation area when the number of gaze vectors exceeds a threshold percentage of gaze vectors.

In Example 9, the subject matter of Examples 1-8 includes, wherein to identify the fixation area, the gaze detection circuit is to: determine gaze vectors that share a similar fixation area; determine gaze vectors that do not converge on the similar fixation area; dismiss the gaze vectors that do not converge on the similar fixation area; and identify the fixation area as the similar fixation area when the number of gaze vectors exceeds a threshold number.

In Example 10, the subject matter of Examples 1-9 includes, wherein to identify the fixation area, the gaze detection circuit is to: use a weighted function to identify a number of gaze vectors that share a similar fixation area; and identify the fixation area as the similar fixation area when the number of gaze vectors exceeds a threshold number.

In Example 11, the subject matter of Examples 1-10 includes, wherein to control the camera, the presentation controller is to cause the camera to follow the fixation area as the fixation area moves about the presentation area.

In Example 12, the subject matter of Examples 1-11 includes, wherein to control the spotlight, the presentation controller is to cause the spotlight to follow the fixation area as the fixation area moves about the presentation area.

Example 13 is a method for multiple subject attention tracking, the method comprising: receiving images of a plurality of people in an audience viewing an event occurring in a presentation area; determining a plurality of gaze vectors of respective people of the plurality of people based on the images; identifying a fixation area using the plurality of gaze vectors; and controlling at least one of a camera or a spotlight, to focus on the fixation area.

In Example 14, the subject matter of Example 13 includes, wherein receiving images comprises receiving images over a composite video channel, a component video channel, an HDMI video channel, or an S-video channel.

In Example 15, the subject matter of Examples 13-14 includes, wherein determining the plurality of gaze vectors comprises analyzing a posture of a person in the images to determine a gaze direction of the person.

In Example 16, the subject matter of Examples 13-15 includes, wherein determining the plurality of gaze vectors comprises analyzing a head position of a person in the images to determine a gaze direction of the person.

In Example 17, the subject matter of Examples 13-16 includes, wherein determining the plurality of gaze vectors comprises analyzing an eye position of a person in the images to determine a gaze direction of the person.

In Example 18, the subject matter of Examples 13-17 includes, wherein determining the plurality of gaze vectors comprises: combining multiple images to create a three-dimensional model of a person a person in the images; and using the three-dimensional model to determine a gaze direction of the person.

In Example 19, the subject matter of Examples 13-18 includes, wherein identifying the fixation area comprises: calculating a number of gaze vectors that share a similar fixation area; and identifying the fixation area as the similar fixation area when the number of gaze vectors exceeds a threshold number.

In Example 20, the subject matter of Examples 13-19 includes, wherein identifying the fixation area comprises: calculating a number of gaze vectors that share a similar fixation area; and identifying the fixation area as the similar fixation area when the number of gaze vectors exceeds a threshold percentage of gaze vectors.

In Example 21, the subject matter of Examples 13-20 includes, wherein identifying the fixation area comprises: determining gaze vectors that share a similar fixation area; determining gaze vectors that do not converge on the similar fixation area; dismissing the gaze vectors that do not converge on the similar fixation area; and identifying the fixation area as the similar fixation area when the number of gaze vectors exceeds a threshold number.

In Example 22, the subject matter of Examples 13-21 includes, wherein identifying the fixation area comprises: using a weighted function to identify a number of gaze vectors that share a similar fixation area; and identifying the fixation area as the similar fixation area when the number of gaze vectors exceeds a threshold number.

In Example 23, the subject matter of Examples 13-22 includes, wherein controlling the camera comprises controlling the camera to follow the fixation area as the fixation area moves about the presentation area.

In Example 24, the subject matter of Examples 13-23 includes, wherein controlling the spotlight comprises controlling the spotlight to follow the fixation area as the fixation area moves about the presentation area.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is an apparatus for multiple subject attention tracking, the apparatus comprising: means for receiving images of a plurality of people in an audience viewing an event occurring in a presentation area; means for determining a plurality of gaze vectors of respective people of the plurality of people based on the images; means for identifying a fixation area using the plurality of gaze vectors; and means for controlling at least one of a camera or a spotlight, to focus on the fixation area.

In Example 28, the subject matter of Example 27 includes, wherein the means for receiving images comprise means for receiving images over a composite video channel, a component video channel, an HDMI video channel, or an S-video channel.

In Example 29, the subject matter of Examples 27-28 includes, wherein the means for determining the plurality of gaze vectors comprise means for analyzing a posture of a person in the images to determine a gaze direction of the person.

In Example 30, the subject matter of Examples 27-29 includes, wherein the means for determining the plurality of gaze vectors comprise means for analyzing a head position of a person in the images to determine a gaze direction of the person.

In Example 31, the subject matter of Examples 27-30 includes, wherein the means for determining the plurality of gaze vectors comprise means for analyzing an eye position of a person in the images to determine a gaze direction of the person.

In Example 32, the subject matter of Examples 27-31 includes, wherein the means for determining the plurality of gaze vectors comprise: means for combining multiple images to create a three-dimensional model of a person a person in the images; and means for using the three-dimensional model to determine a gaze direction of the person.

In Example 33, the subject matter of Examples 27-32 includes, wherein the means for identifying the fixation area comprise: means for calculating a number of gaze vectors that share a similar fixation area; and means for identifying the fixation area as the similar fixation area when the number of gaze vectors exceeds a threshold number.

In Example 34, the subject matter of Examples 27-33 includes, wherein the means for identifying the fixation area comprise: means for calculating a number of gaze vectors that share a similar fixation area; and means for identifying the fixation area as the similar fixation area when the number of gaze vectors exceeds a threshold percentage of gaze vectors.

In Example 35, the subject matter of Examples 27-34 includes, wherein the means for identifying the fixation area comprise: means for determining gaze vectors that share a similar fixation area; means for determining gaze vectors that do not converge on the similar fixation area; means for dismissing the gaze vectors that do not converge on the similar fixation area; and means for identifying the fixation area as the similar fixation area when the number of gaze vectors exceeds a threshold number.

In Example 36, the subject matter of Examples 27-35 includes, wherein the means for identifying the fixation area comprise: means for using a weighted function to identify a number of gaze vectors that share a similar fixation area; and means for identifying the fixation area as the similar fixation area when the number of gaze vectors exceeds a threshold number.

In Example 37, the subject matter of Examples 27-36 includes, wherein the means for controlling the camera comprise means for controlling the camera to follow the fixation area as the fixation area moves about the presentation area.

In Example 38, the subject matter of Examples 27-37 includes, wherein the means for controlling the spotlight comprise means for controlling the spotlight to follow the fixation area as the fixation area moves about the presentation area.

Example 39 is at least one machine-readable medium including instructions for multiple subject attention tracking, which when executed by a machine, cause the machine to perform the operations comprising: receiving images of a plurality of people in an audience viewing an event occurring in a presentation area; determining a plurality of gaze vectors of respective people of the plurality of people based on the images; identifying a fixation area using the plurality of gaze vectors; and controlling at least one of a camera or a spotlight, to focus on the fixation area.

In Example 40, the subject matter of Example 39 includes, wherein receiving images comprises receiving images over a composite video channel, a component video channel, an HDMI video channel, or an S-video channel.

In Example 41, the subject matter of Examples 39-40 includes, wherein determining the plurality of gaze vectors comprises analyzing a posture of a person in the images to determine a gaze direction of the person.

In Example 42, the subject matter of Examples 39-41 includes, wherein determining the plurality of gaze vectors comprises analyzing a head position of a person in the images to determine a gaze direction of the person.

In Example 43, the subject matter of Examples 39-42 includes, wherein determining the plurality of gaze vectors comprises analyzing an eye position of a person in the images to determine a gaze direction of the person.

In Example 44, the subject matter of Examples 39-43 includes, wherein determining the plurality of gaze vectors comprises: combining multiple images to create a three-dimensional model of a person a person in the images; and using the three-dimensional model to determine a gaze direction of the person.

In Example 45, the subject matter of Examples 39-44 includes, wherein identifying the fixation area comprises: calculating a number of gaze vectors that share a similar fixation area; and identifying the fixation area as the similar fixation area when the number of gaze vectors exceeds a threshold number.

In Example 46, the subject matter of Examples 39-45 includes, wherein identifying the fixation area comprises: calculating a number of gaze vectors that share a similar fixation area; and identifying the fixation area as the similar fixation area when the number of gaze vectors exceeds a threshold percentage of gaze vectors.

In Example 47, the subject matter of Examples 39-46 includes, wherein identifying the fixation area comprises: determining gaze vectors that share a similar fixation area; determining gaze vectors that do not converge on the similar fixation area; dismissing the gaze vectors that do not converge on the similar fixation area; and identifying the fixation area as the similar fixation area when the number of gaze vectors exceeds a threshold number.

In Example 48, the subject matter of Examples 39-47 includes, wherein identifying the fixation area comprises: using a weighted function to identify a number of gaze vectors that share a similar fixation area; and identifying the fixation area as the similar fixation area when the number of gaze vectors exceeds a threshold number.

In Example 49, the subject matter of Examples 39-48 includes, wherein controlling the camera comprises controlling the camera to follow the fixation area as the fixation area moves about the presentation area.

In Example 50, the subject matter of Examples 39-49 includes, wherein controlling the spotlight comprises controlling the spotlight to follow the fixation area as the fixation area moves about the presentation area.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50.

Example 54 is a method to implement of any of Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for multiple subject attention tracing, the system comprising:
   an input video controller to receive images of a plurality of people in an audience viewing an event occurring in a presentation area;
   a gaze detection circuit to:
      determine a plurality of gaze vectors of respective people of the plurality of people based on the images; and
      identify a fixation area using the plurality of gaze vectors; and
   a presentation controller to control at least one of a camera or a spotlight, to focus on the fixation area,
   wherein to identify the fixation area, the gaze detection circuit is to:
      use a weighted function that weighs gaze vectors of the plurality of gaze vectors that converge on one of a plurality of common fixation areas higher than gaze vectors of the plurality of gaze vectors that are not directed toward any one of the plurality of common fixation areas, a common fixation area being one that has at least two gaze vectors directed to it, the weighted function to identify one of the plurality of common fixation areas as the fixation area.

2. The system of claim 1, wherein the video controller is to receive images over a composite video channel, a component video channel, an HDMI video channel, or an S-video channel.

3. The system of claim 1, wherein to determine the plurality of gaze vectors, the gaze detection circuit is to analyze a posture of a person in the images to determine a gaze direction of the person.

4. The system of claim 1, wherein to determine the plurality of gaze vectors, the gaze detection circuit is to analyze a head position of a person in the images to determine a gaze direction of the person.

5. The system of claim 1, wherein to determine the plurality of gaze vectors, the gaze detection circuit is to analyze an eye position of a person in the images to determine a gaze direction of the person.

6. The system of claim 1, wherein to determine the plurality of gaze vectors, the gaze detection circuit is to:
   combine multiple images to create a three-dimensional model of a person in the images; and
   use the three-dimensional model to determine a gaze direction of the person.

7. The system of claim 1, wherein to identify the fixation area, the gaze detection circuit is to:
   calculate a number of gaze vectors that share a similar fixation area; and
   identify the fixation area as the similar fixation area when the number of gaze vectors exceeds a threshold number.

8. The system of claim 1, wherein to identify the fixation area, the gaze detection circuit is to:
   calculate a number of gaze vectors that share a similar fixation area; and
   identify the fixation area as the similar fixation area when the number of gaze vectors exceeds a threshold percentage of gaze vectors.

9. The system of claim 1, wherein to identify the fixation area, the gaze detection circuit is to:
   determine gaze vectors that share a similar fixation area;
   determine gaze vectors that do not converge on the similar fixation area;
   dismiss the gaze vectors that do not converge on the similar fixation area; and
   identify the fixation area as the similar fixation area when the number of gaze vectors exceeds a threshold number.

10. The system of claim 1, wherein to control the camera, the presentation controller is to cause the camera to follow the fixation area as the fixation area moves about the presentation area.

11. The system of claim 1, wherein to control the spotlight, the presentation controller is to cause the spotlight to follow the fixation area as the fixation area moves about the presentation area.

12. A method for multiple subject attention tracking, the method comprising:
   receiving images of a plurality of people in an audience viewing an event occurring in a presentation area;
   determining a plurality of gaze vectors of respective people of the plurality of people based on the images;
   identifying a fixation area using the plurality of gaze vectors, wherein identifying the fixation area includes identifying the fixation area when a majority of the gaze vectors are directed at the fixation area; and
   controlling at least one of a camera or a spotlight, to focus on the fixation area.

13. The method of claim 12, wherein receiving images comprises receiving images over a composite video channel, a component video channel, an HDMI video channel, or an S-video channel.

14. The method of claim 12, wherein determining the plurality of gaze vectors comprises analyzing a posture of a person in the images to determine a gaze direction of the person.

15. The method of claim 12, wherein determining the plurality of gaze vectors comprises analyzing a head position of a person in the images to determine a gaze direction of the person.

16. The method of claim 12, wherein determining the plurality of gaze vectors comprises analyzing an eye position of a person in the images to determine a gaze direction of the person.

17. The method of claim 12, wherein determining the plurality of gaze vectors comprises:
   combining multiple images to create a three-dimensional model of a person in the images; and
   using the three-dimensional model to determine a gaze direction of the person.

18. The method of claim 12, wherein identifying the fixation area comprises:
   calculating a number of gaze vectors that share a similar fixation area; and
   identifying the fixation area as the similar fixation area when the number of gaze vectors exceeds a threshold number.

19. The method of claim 12, wherein identifying the fixation area comprises:

calculating a number of gaze vectors that share a similar fixation area; and identifying the fixation area as the similar fixation area when the number of gaze vectors exceeds a threshold percentage of gaze vectors.

20. The method of claim 12, wherein identifying the fixation area comprises:

determining gaze vectors that share a similar fixation area;

determining gaze vectors that do not converge on the similar fixation area;

dismissing the gaze vectors that do not converge on the similar fixation area; and identifying the fixation area as the similar fixation area when the number of gaze vectors exceeds a threshold number.

21. The method of claim 12, wherein identifying the fixation area comprises:

using a weighted function to identify a number of gaze vectors that share a similar fixation area; and identifying the fixation area as the similar fixation area when the number of gaze vectors exceeds a threshold number.

22. At least one non-transitory machine-readable medium including instructions for multiple subject attention tracking, which when executed by a machine, cause the machine to perform the operations comprising:

receiving images of a plurality of people in an audience viewing an event occurring in a presentation area;

determining a plurality of gaze vectors of respective people of the plurality of people based on the images, wherein determining the plurality of gaze vectors comprises:

combining multiple images to create a three-dimensional model of a person in the images; and using the three-dimensional model to determine a gaze direction of the person;

identifying a fixation area using the plurality of gaze vectors; and controlling at least one of a camera or a spotlight, to focus on the fixation area.

23. The machine-readable medium of claim 22, wherein identifying the fixation area comprises:

using a weighted function to identify a number of gaze vectors that share a similar fixation area; and identifying the fixation area as the similar fixation area when the number of gaze vectors exceeds a threshold number.

* * * * *

UNITED STATES PATENT AND TRADEMARK OFFICE
CERTIFICATE OF CORRECTION

PATENT NO. : 10,803,618 B2
APPLICATION NO. : 16/021741
DATED : October 13, 2020
INVENTOR(S) : Hiltner et al.

Page 1 of 1

It is certified that error appears in the above-identified patent and that said Letters Patent is hereby corrected as shown below:

In the Claims

In Column 15, Line 13, in Claim 1, delete "tracing," and insert --tracking,-- therefor Signed and Sealed this
Second Day of February, 2021

Drew Hirshfeld
*Performing the Functions and Duties of the*
*Under Secretary of Commerce for Intellectual Property and*
*Director of the United States Patent and Trademark Office*